(12) United States Patent
Feeney

(10) Patent No.: US 9,982,984 B2
(45) Date of Patent: May 29, 2018

(54) TAPE MEASURE MARKING ATTACHMENT ASSEMBLY

(71) Applicant: Anthony Feeney, Cambridge (CA)

(72) Inventor: Anthony Feeney, Cambridge (CA)

(*) Notice: Subject to any disclaimer, the term of this patent is extended or adjusted under 35 U.S.C. 154(b) by 89 days.

(21) Appl. No.: 14/964,694

(22) Filed: Dec. 10, 2015

(65) Prior Publication Data

US 2017/0167842 A1    Jun. 15, 2017

(51) Int. Cl.
*G01B 3/10* (2006.01)

(52) U.S. Cl.
CPC .... *G01B 3/1084* (2013.01); *G01B 2003/1089* (2013.01)

(58) Field of Classification Search
CPC .......... G01B 2003/1089; G01B 3/1084; G01B 3/1041; G01B 3/1056; G01B 2003/1046; G01B 2003/1053
USPC .................................................... 33/755–770
See application file for complete search history.

(56) References Cited

U.S. PATENT DOCUMENTS

| | | | | |
|---|---|---|---|---|
| 4,667,412 A | * | 5/1987 | Carlson | G01B 3/1084 33/666 |
| 4,965,941 A | * | 10/1990 | Agostinacci | B25H 7/04 33/668 |
| 5,829,152 A | * | 11/1998 | Potter | B25H 7/04 33/668 |
| 6,178,655 B1 | * | 1/2001 | Potter | B25H 7/04 33/42 |
| 6,223,443 B1 | * | 5/2001 | Jacobs | B43L 9/04 33/27.03 |
| D458,166 S | | 6/2002 | Ramos | |
| 6,513,261 B2 | | 2/2003 | Johnson | |
| 6,694,622 B2 | | 2/2004 | Kim | |
| 6,725,560 B2 | | 4/2004 | Smith | |
| 6,804,898 B1 | | 10/2004 | Hsu | |
| 6,912,799 B1 | * | 7/2005 | Smith | B25H 7/04 33/27.031 |
| 6,931,734 B2 | | 8/2005 | Elder | |
| 7,062,859 B1 | * | 6/2006 | Revnell | B43L 12/00 33/32.1 |
| 8,020,312 B1 | * | 9/2011 | McGahan | B26B 29/06 30/286 |
| 8,819,954 B1 | | 9/2014 | Fernandez | |
| 2003/0159304 A1 | * | 8/2003 | Black | B25H 7/04 33/668 |
| 2004/0025364 A1 | * | 2/2004 | Elder | G01B 3/1071 33/770 |
| 2007/0294905 A1 | | 12/2007 | Whittenburg | |
| 2014/0237838 A1 | * | 8/2014 | Phelps | G01B 3/1084 33/770 |
| 2017/0167842 A1 | * | 6/2017 | Feeney | G01B 3/1084 |

* cited by examiner

*Primary Examiner* — Yaritza Guadalupe-McCall

(57) ABSTRACT

A tape measure marking attachment assembly includes a mount including a housing that has a top side, a bottom side, a front side, and a rear side. The top side has a slot extending downwardly therein that releasably receives and frictionally engages a tab of a tape measure. A receiver is positioned on the mount. A marking element is releasably engaged to the receiver.

4 Claims, 4 Drawing Sheets

TAPE MEASURE MARKING ATTACHMENT ASSEMBLY

BACKGROUND OF THE DISCLOSURE

Field of the Disclosure

The disclosure relates to tape measure marking devices and more particularly pertains to a new tape measure marking device for marking material adjacent to an end tab of a tape measure.

SUMMARY OF THE DISCLOSURE

An embodiment of the disclosure meets the needs presented above by generally comprising a mount including a housing that has a top side, a bottom side, a front side, and a rear side. The top side has a slot extending downwardly therein that releasably receives and frictionally engages a tab of a tape measure. A receiver is positioned on the mount. A marking element is releasably engaged to the receiver.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
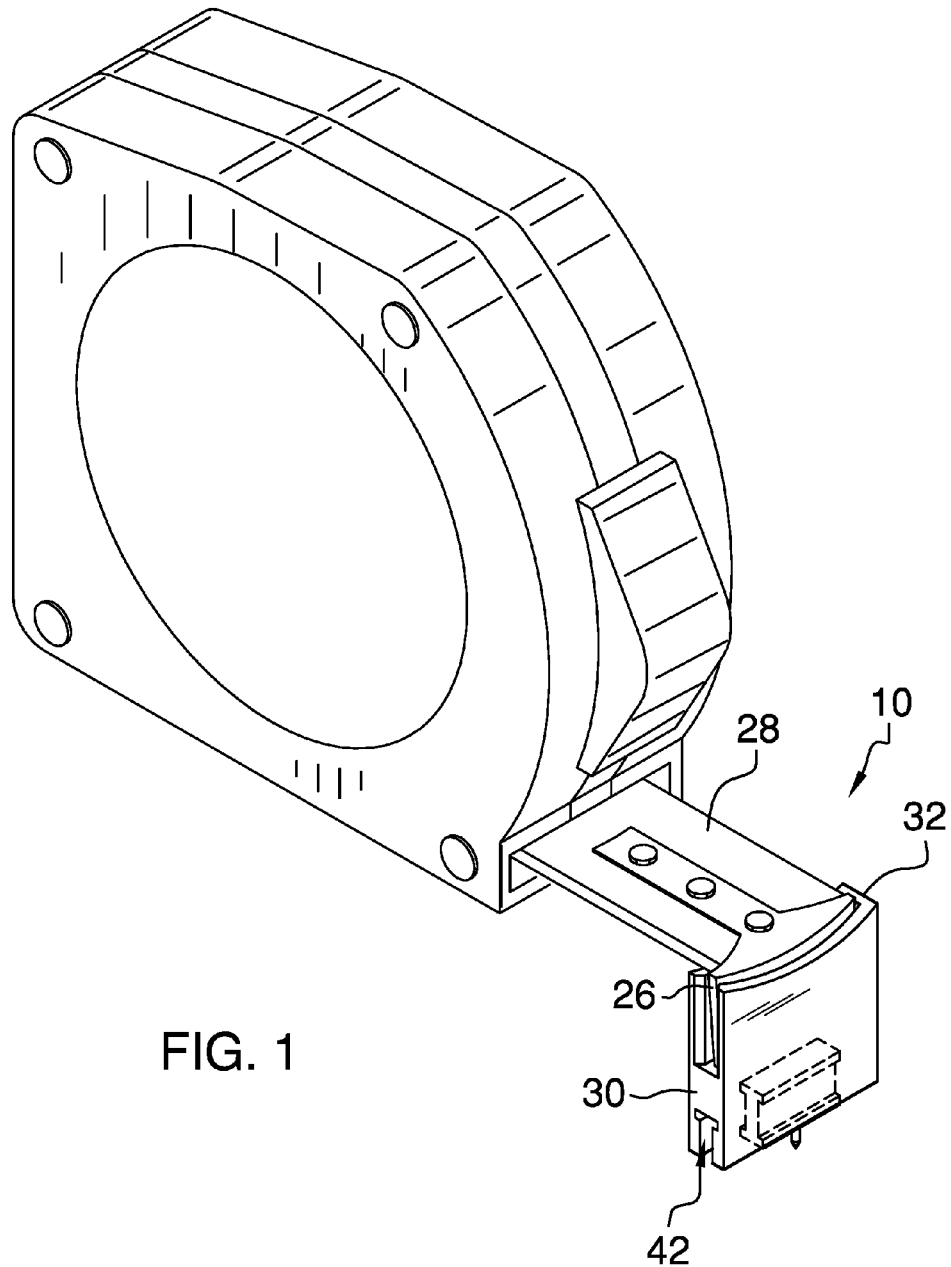
FIG. 1 is a front perspective view of a tape measure marking attachment assembly according to an embodiment of the disclosure.
Figure 2:
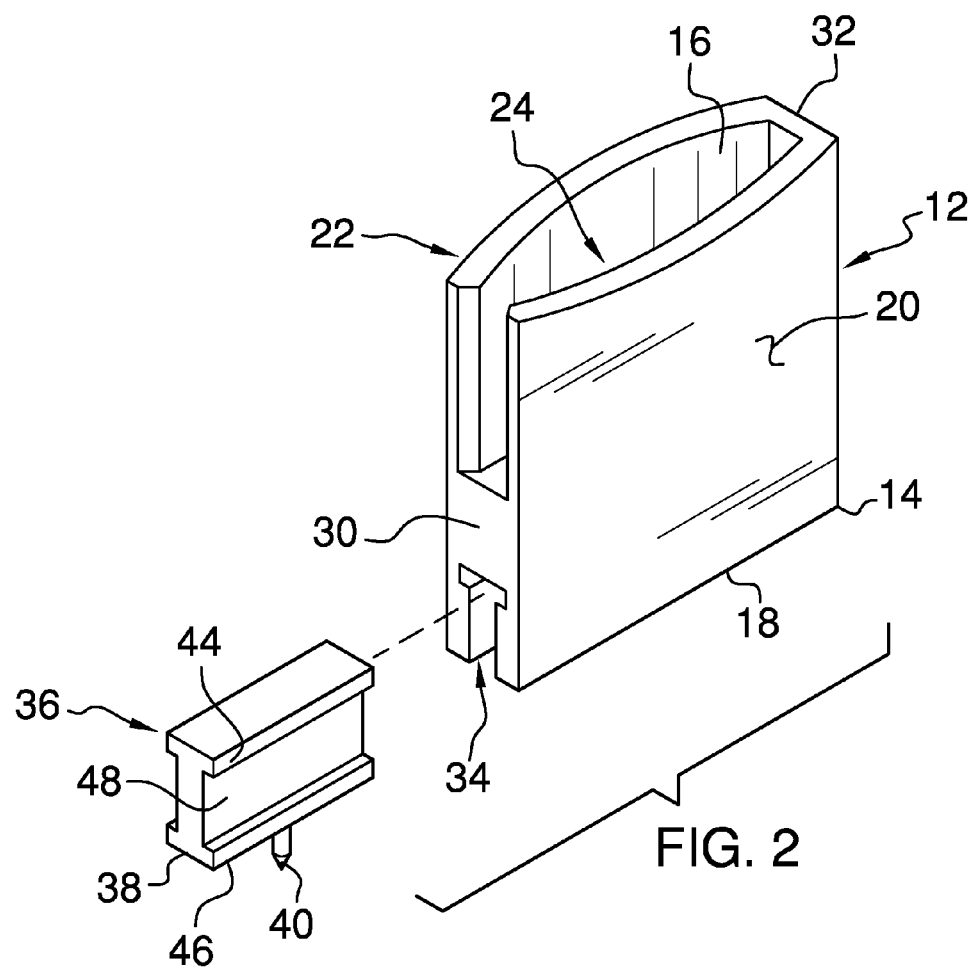
FIG. 2 is a front perspective view of an embodiment of the disclosure.
Figure 3:
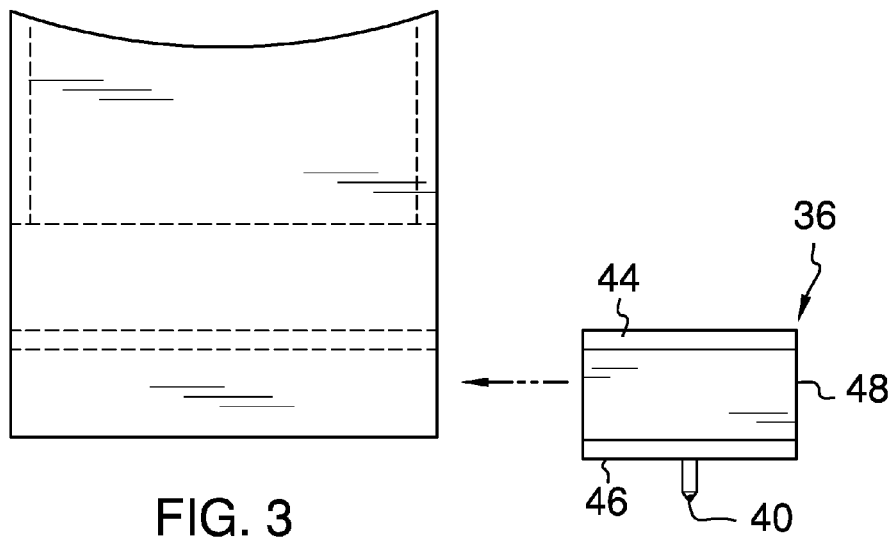
FIG. 3 is a front view of an embodiment of the disclosure.
Figure 4:
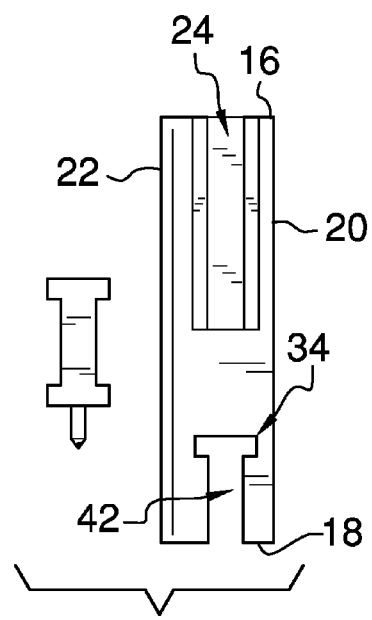
FIG. 4 is a side view of an embodiment of the disclosure.

With reference now to the drawings, and in particular to FIGS. 1 through 5 thereof, a new tape measure marking device embodying the principles and concepts of an embodiment of the disclosure and generally designated by the reference numeral 10 will be described.

As best illustrated in FIGS. 1 through 5, the tape measure marking attachment assembly 10 generally comprises a mount 12 including a housing 14 that has a top side 16, a bottom side 18, a front side 20, a rear side 22. The housing 12 may be substantially solid and may comprise a rigid material or a resiliently compressible material. The top side 16 has a slot 24 extending downwardly therein. The slot 24 is configured to releasably receive and frictionally engage a tab 26 of a tape measure 28 such that the mount 12 extends downwardly from the tab 26. The slot 24 may have an arcuate shape to better frictionally engage the tab 26. Additionally, each wall of the slot 24 may be concavely arcuate to allow the user to either have the slot 24 first receive either a left edge or a right edge of the tab 26. Because the tab 26 is typically arcuate, the user will thereby be able to selectively position the tab 26 relative to the mount 12 when the tape measure is used on a vertical surface in a horizontal measuring action. The slot 24 may extend through a first lateral side 30 of the mount 12 while a second lateral side 32 is closed. The slot 24 may be wider at the first lateral side 30 and taper inward as it extends into the housing 14 to facilitate insertion of the tab 26 into the slot 24.

A receiver 34 is positioned on the mount 12. A marking element 36 is releasably engaged to the receiver 34. The marking element 36 comprises a holder 38 and a graphite member 40 is attached to and extends downwardly from the holder 38. The receiver 34 may include a notch 42 extending into the first lateral edge 30 and the bottom side 18 of the mount 12. The holder 38 has a shape being matched to the notch 42. For example, the holder 38 may include an upper shoulder 44 and a lower shoulder 46 spaced from each other by a narrower middle section 48. The upper shoulder 44 will slide into a widened portion of the notch 42 while the lower shoulder 46 abuts the bottom side 18 of the mount 12. The graphite member 40 extends downwardly from the mount 12 when the marking element 36 is engaged with the receiver 34. The holder 38 is slidable into the notch 42 to frictionally retain the holder 38 in the notch 42.

Figure 5:
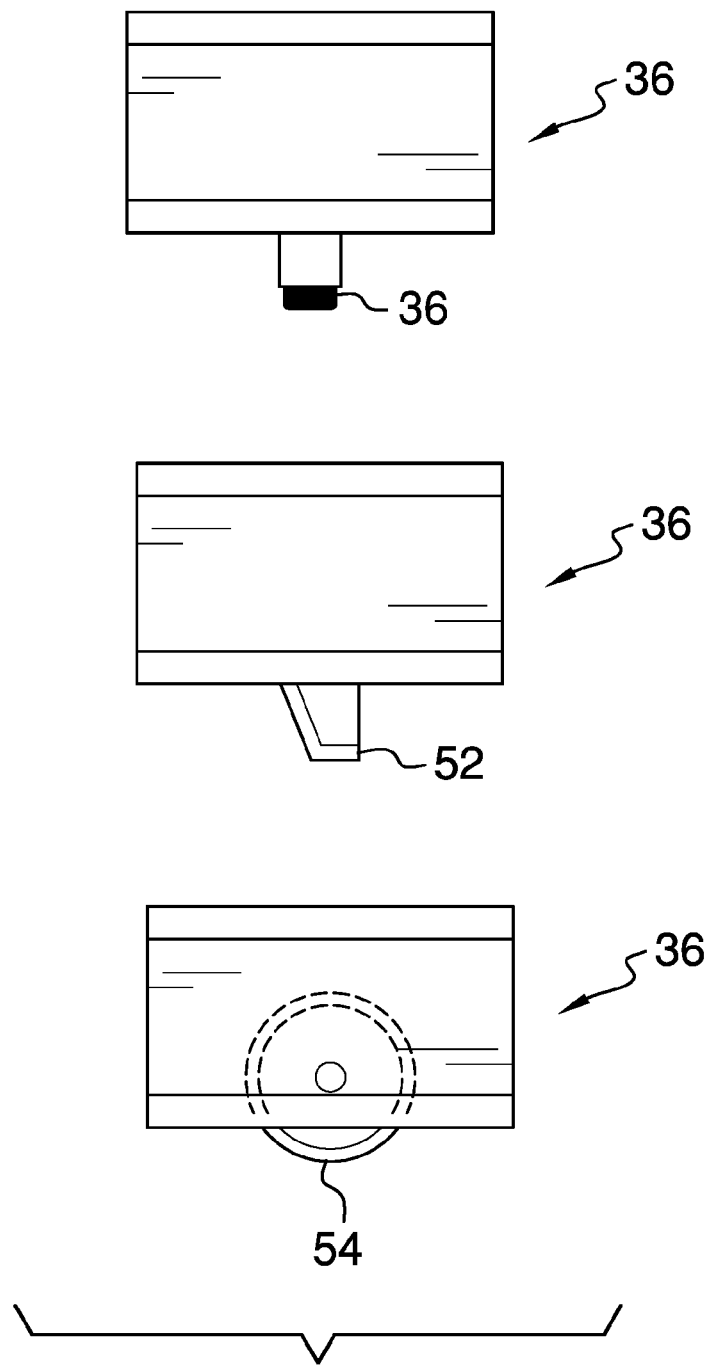
FIG. 5 is a front view of marking elements of embodiments of the disclosure.

As can be seen in the FIG. 5, alternate marking elements 36 may be provided such a felt tip marker 50, a blade 52, a rotating scoring wheel 54 and the like. It should be understood that any type of device typically used for marking an object may be utilized.

In use, tab 26 of a tape measure 28 is coupled to the housing 14 so that the receiver 34 extends downwardly from the tab 26. Thus, the marking element 36 will be aligned with the tab 26 and will allow the user to mark a position where the tab 26 is located to ensure an accurate measurement marking. The assembly 10 may be removed as desired when not needed and multiple marking elements 36 of different capabilities may be supplied and used when necessary.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A tape measure attachment configured to releasably engage a tab attached to an end of a tape measure, said attachment comprising:
   a mount including a housing having a top side, a bottom side, a front side, and a rear side, said top side having a slot extending downwardly therein, said slot being configured to releasably receive and frictionally engage a tab of a tape measure;
   a receiver being positioned on said mount, said receiver including a notch extending into a first lateral edge and said bottom side of said mount; and
   a marking element being releasably engaged to said receiver, said marking element comprising a holder and a graphite member being attached to and extending downwardly from said holder, said holder being slidable into said notch to frictionally retain said holder in said notch.

2. The tape measure attachment according to claim 1, wherein said slot has an arcuate shape.

3. The tape measure attachment according to claim 1, wherein said slot extends through a first lateral side of said mount.

4. A tape measure attachment configured to releasably engage a tab attached to an end of a tape measure, said attachment comprising:
   a mount including a housing having a top side, a bottom side, a front side, and a rear side, said top side having a slot extending downwardly therein, said slot being configured to releasably receive and frictionally engage a tab of a tape measure, said slot having an arcuate shape, said slot extending through a first lateral side of said mount;
   a receiver being positioned on said mount;
   a marking element being releasably engaged to said receiver, said marking element comprising a holder and a graphite member being attached to and extending downwardly from said holder; and
   said receiver including a notch extending into said first lateral edge and said bottom side of said mount, said graphite extending downwardly from said mount when said marking element is engaged with said receiver, said holder being slidable into said notch to frictionally retain said holder in said notch.

\* \* \* \* \*